(12) United States Patent
Kowalski

(10) Patent No.: US 10,889,314 B2
(45) Date of Patent: Jan. 12, 2021

(54) ICE FISHING SLED WITH FLOTATION FOR SELF-RESCUE

(71) Applicant: Nicholas L. Kowalski, Traverse City, MI (US)

(72) Inventor: Nicholas L. Kowalski, Traverse City, MI (US)

( * ) Notice: Subject to any disclaimer, the term of this patent is extended or adjusted under 35 U.S.C. 154(b) by 0 days.

(21) Appl. No.: 16/458,389

(22) Filed: Jul. 1, 2019

(65) Prior Publication Data

US 2020/0307669 A1 Oct. 1, 2020

Related U.S. Application Data

(60) Provisional application No. 62/827,478, filed on Apr. 1, 2019.

(51) Int. Cl.
*B62B 15/00* (2020.01)
*B62B 17/00* (2006.01)
*B63C 9/32* (2006.01)

(52) U.S. Cl.
CPC ............ *B62B 15/00* (2013.01); *B62B 15/003* (2013.01); *B62B 17/005* (2013.01); *B63C 9/32* (2013.01)

(58) Field of Classification Search
CPC ..... B62B 15/00; B62B 15/003; B62B 15/007; B62B 17/005; B62B 17/06; B62B 2202/40; B60F 3/00; B60F 3/0038; B63C 9/32
See application file for complete search history.

(56) References Cited

U.S. PATENT DOCUMENTS

| 861,607 A | 7/1907 | Pfeifer | |
|---|---|---|---|
| 3,348,247 A * | 10/1967 | Flannigan | B62B 15/00 441/65 |
| 3,479,046 A * | 11/1969 | Thompson | B62B 15/00 280/18 |
| 3,600,000 A * | 8/1971 | Bergstrom | B62B 15/00 280/18 |
| 3,711,879 A * | 1/1973 | Siefert | B63C 9/32 441/82 |

(Continued)

FOREIGN PATENT DOCUMENTS

GB 2567743 A * 4/2019 ............. B63C 9/082

OTHER PUBLICATIONS

In-Depth Outdoors, Fox Trac Ice Cycle, Ice Fishing Forum (internet webpage), Oct. 6, 2013, 7 pages, www.in-depthoutdoors.com, U.S.

(Continued)

*Primary Examiner* — Steve Clemmons
(74) *Attorney, Agent, or Firm* — Northern Michigan Patent Law, PLC

(57) ABSTRACT

An ice fishing sled comprising a plastic tub body with raised walls, and flotation bumpers secured to the exterior of the walls of the tub body around the upper edges of the walls to form a peripheral flotation shelf extending outwardly from the tub body. Bottom surfaces of the flotation bumpers are spaced above the bottom of the tub body, and can function as integral raised runners along the sides of the sled when encountering deep snow or uneven ice. The tub may optionally have a peripheral flange or lip extending outwardly from the upper periphery of the tub walls, with the peripheral flotation shelf located beneath and adjacent or against the underside of the flange or lip.

4 Claims, 5 Drawing Sheets

(56) References Cited

U.S. PATENT DOCUMENTS

| | | | | |
|---|---|---|---|---|
| 4,079,953 A * | 3/1978 | Howarth, Jr. | ............ | B62B 13/16 280/19 |
| 4,730,569 A * | 3/1988 | Colson | .................... | B62B 15/00 114/43 |
| 4,968,046 A * | 11/1990 | O'Connell | .............. | B62B 15/00 114/43 |
| 5,320,567 A | 6/1994 | Beer | | |
| 5,575,490 A * | 11/1996 | Simpson, Jr. | .......... | A01K 97/01 114/43 |
| 6,014,833 A | 1/2000 | Benavidez | | |
| 6,061,853 A * | 5/2000 | Laaksonen | ............. | A61G 1/007 5/625 |
| 6,190,222 B1 * | 2/2001 | Senger | ....................... | B63C 9/32 441/82 |
| 6,641,446 B1 * | 11/2003 | Bentley | .................... | B62B 13/06 280/19 |
| 7,549,661 B2 * | 6/2009 | Jackson | .................. | B62B 1/208 280/204 |
| 7,959,182 B2 * | 6/2011 | Klein | ...................... | A01K 97/01 280/652 |
| 8,881,327 B2 * | 11/2014 | Kenalty | ................. | A61G 1/044 5/628 |
| 8,910,956 B2 * | 12/2014 | Bengtzen | .............. | B62B 15/004 280/79.2 |
| 9,738,129 B2 * | 8/2017 | Dovel | .................... | B63H 16/08 |
| 10,479,154 B2 * | 11/2019 | Butler | ................... | B62B 15/007 |
| 10,526,001 B2 * | 1/2020 | Shervey | .................. | B62B 13/06 |
| 2004/0217563 A1 * | 11/2004 | Butts, Jr. | ................. | B62B 15/00 280/18 |
| 2006/0055130 A1 * | 3/2006 | Williams, Jr. | ......... | B60D 1/143 280/24 |
| 2006/0181038 A1 * | 8/2006 | Walter | .................. | B62B 5/0013 280/19.1 |
| 2007/0134999 A1 * | 6/2007 | Ficht | ........................ | B63H 7/02 440/37 |
| 2008/0048417 A1 | 2/2008 | Schroeder | | |
| 2008/0246269 A1 * | 10/2008 | Cheung | ................... | B62B 15/00 280/845 |
| 2013/0277927 A1 * | 10/2013 | Harvey | ................. | B62B 15/007 280/19 |

OTHER PUBLICATIONS

Northern Sled Works, About Us—Tales and Testimonials, internet webpage, 2018, 3 pages, www.northernsledworks.com, U.S.

Otter Outdoors, Otter Pro Sled Magnum, internet webpage, 2018, 5 pages, www.otteroutdoors.com, U.S.

Amazon.com, Shappell Jet Sled Wear Bars, internet advertisement, Aug. 23, 2016 (earliest review), 6 pages, www.amazon.com, U.S.

* cited by examiner

ICE FISHING SLED WITH FLOTATION FOR SELF-RESCUE

RELATED APPLICATIONS/PRIORITY BENEFIT CLAIM

This application claims the benefit of U.S. Provisional Application No. 62/827,478, filed Apr. 1, 2019 by the same inventor (Kowalski), the entirety of which provisional application is hereby incorporated by reference.

FIELD

The subject matter of the present application is in the field of ice fishing sleds.

BACKGROUND

Small plastic sleds are commonly used for dragging ice fishing equipment from shore out onto frozen lakes. While these sleds have some limited flotation ability due to their lightweight plastic construction and large internal empty volume, they are not designed to support the weight of a human in water.

A constant concern for ice fishermen is breaking through thin ice into the frigid water, and then not having sufficient purchase to climb out of the hole before hypothermia sets in and makes escape impossible. Conventional ice fishing sleds do not provide enough flotation to be of much help with self-rescue after breaking through the ice.

Devices for helping ensure safety or providing multi-terrain capability while crossing lakes in winter are known, but are generally not practical for recreational ice fishing.

For example, it is known to equip old-fashioned "ice cycles" (ice-specific machines somewhat similar to a snowmobile) with pontoon-like floats, apparently to keep the machine floating if it breaks through the ice.

U.S. Pat. No. 861,607 to Pfeifer shows a combined sleigh and boat designed for operation on open water (with paddles) and snow or ice (with animal power or sails).

U.S. Pat. No. 5,320,567 to Beer shows an aquatic rescue device for use on ice at the edge of open water, with a pair of elongated buoyant bodies connected in a spaced parallel relationship with large handles. A rescuer can walk/slide the device across the ice while standing between the buoyant bodies, transferring body weight onto the buoyant bodies.

U.S. Pat. No. 6,014,833 to Benavidez shows a floating fisherman's device made of Styrofoam® foam, with a body including large openings for a utility bucket, cold drinks, and fishing equipment. The device has a pair of metal skids extending a distance from the bottom surface so that the body of the device is held above the terrain to protect the bottom surface and to keep the bucket (which extends through the foam body) off the terrain.

U.S. Patent Application Publication No. 2008/0048417 A1 shows an amphibious utility cart with a lounge chair type platform used for equipment while going to a destination, and as a flotation chair for an outdoorsman or his dog when at the destination.

BRIEF SUMMARY

The present invention is a plastic tub-type sled with improved flotation capability, for supporting the weight of an ice fisherman enough to help with self-rescue if the sled and the fisherman have broken through the ice on a frozen body of water.

The sled comprises a plastic tub body having raised walls along the sides and ends, a bottom, an open top, and peripheral upper flanges extending from the upper edges of the sidewalls. Foam or equivalent flotation bodies (hereafter "bumpers") are secured to the exterior of the tub sidewalls underneath the peripheral flanges, in a substantially continuous array around the upper periphery of the tub body. The flotation bumpers are in contact with, or at least closely adjacent, the undersides of the flanges. The bumpers in further form have bottom surfaces spaced above the bottom of the tub body.

In yet a further form, the bumpers have a width greater than the width of the peripheral flanges on the tub body, such that upper surfaces of the bumpers extend beyond the flanges to define a shelf of the flotation material beyond the edges of the plastic tub body.

In still a further form, the bottom surfaces of the bumpers along the longitudinal sides of the tub body are faced with hardened, low-friction runners which themselves are spaced above the bottom of the tub body. The runner surfaces of the side flotation bumpers only come into contact with snow if the snow is deeper than the spacing of the bumpers from the tub bottom, or into contact with ice if large uneven surfaces are encountered.

These and other features and advantages of the invention will become apparent from the detailed description below, in light of the accompanying drawings.

DETAILED DESCRIPTION

Figure 1:
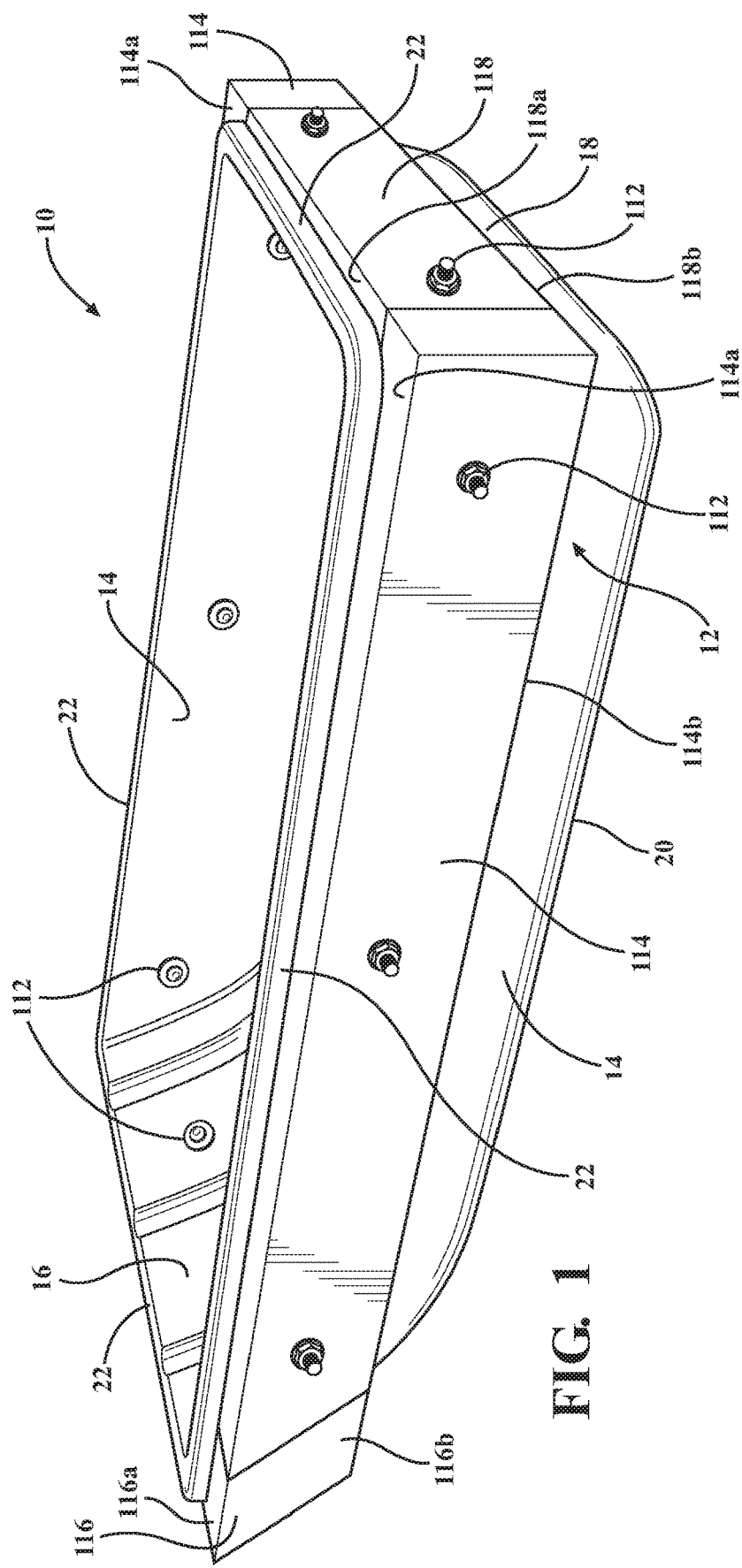
FIG. 1 is a rear-end perspective view of an example sled according to the invention.
Figure 2:
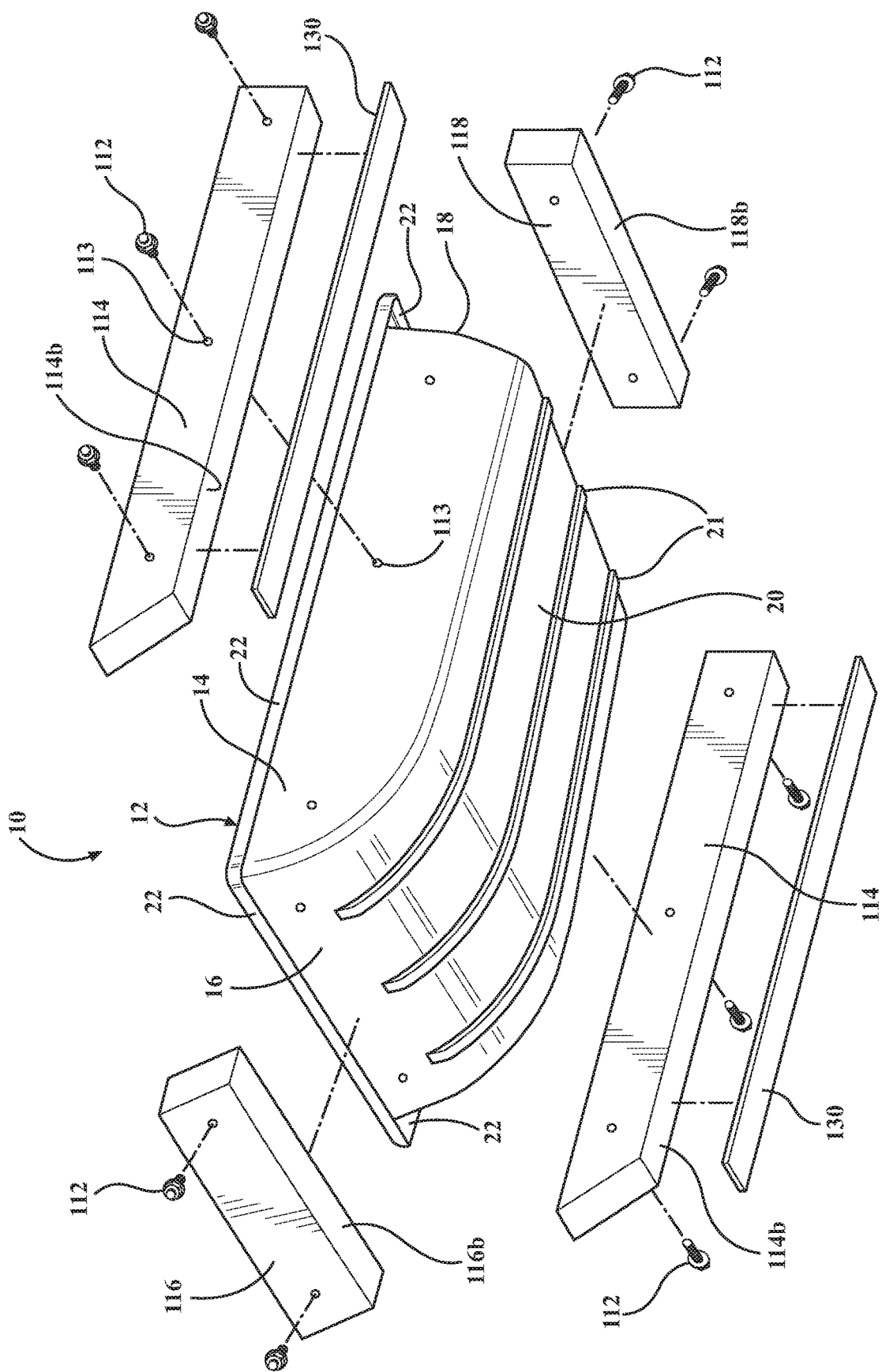
FIG. 2 is a bottom front-end perspective view of the sled of FIG. 1, with the flotation bumpers shown in exploded assembly view relative to the sled's tub body.

FIGS. 1 and 2 show an ice fishing sled 10 according to the invention in exemplary form in order to teach how to make and use the claimed invention. Sled 10 comprises a plastic tub body 12 of generally conventional type and material, for example formed from a molded polyethylene or similar material. Plastic tub body 12 includes longitudinal sidewalls 14, a front end wall 16, a rear end wall 18, and a bottom 20, joined together as an integral molded shell. Bottom 20 may be reinforced for sliding on rough snow or ice with longitudinal ribs 21.

The upper edges of the walls 14, 16, and 18 typically (and preferably) each have a substantially continuous, outwardly extending lip or flange 22, which in the illustrated example are joined at the corners of the tub body to form an essentially continuous flange around the upper periphery of the walls 14, 16, 18 of the tub body 12.

The details of tub body 12 may vary for purposes of the invention, for example in terms of materials, construction methods, and shape and dimensions. The illustrated rectangular tub body 12 is representative of a common type of commercially available ice fishing sled that will be familiar to those skilled in the art, although other shapes with, for example, different numbers of sides or more rounded contours are possible.

Tub body 12 is supplemented by one or more flotation bodies secured or formed on and projecting from the upper, outer surfaces of sidewalls 14 and preferably also of front and end walls 16, 18. In the illustrated example the flotation bodies are shown as a plurality of elongated bumpers or blocks 114, 116, 118 of a durable, lightweight, closed-cell (non-absorbent) foam material suitable for flotation, for example extruded or pre-formed foam of known, commercially available type such as polyurethane flotation foam.

Flotation bumpers 114-118 are sized to generally match the length of their corresponding tub walls 14-18 to create an upper perimeter shelf of flotation material around the upper periphery of the tub body 12. Depending on the perimeter shape of the tub body 12 (e.g., well-defined corners, rounded ends), it might be preferable to form flotation bumpers 114, 116, and 118 as a single unitary body or bumper shaped to wrap around most or all of the periphery of the tub body 12. Further, while single bumpers 114-118 are shown extending essentially the full length of each of corresponding walls 14-18, it would be acceptable to mount multiple shorter bumpers 114-118 along the lengths of their respective walls 14-18, either in a continuous array or with some reasonable spacing resulting in a substantially equivalent and evenly-balanced degree of flotation along the lengths of the walls.

The thicknesses and heights of the flotation bumpers 114-118 may vary according to the desired degree of flotation or buoyancy for the selected bumper material and the dimensions of the tub body 12. Bumpers with generally rectangular cross-sections and flat upper and lower surfaces as illustrated are preferred, however, as providing a flat upper shelf and a flat lower shelf around the periphery of the tub body, which may help with grip or purchase when using the sled for self-rescue, balance, and/or for resting the lower edges of some of the bumpers on the edge of ice around a hole if the tub body is in the water. In general the bumpers 114-118 should have a thickness sufficient to extend out from the sides of the tub body at least a few inches. For perspective, in the illustrated example sled 10 may have typical dimensions on the order of approximately two to five feet long, a width on the order of one-and-a-half to two feet wide, and a wall height on the order of six to twelve inches. The width of the flotation bumpers as pictured is on the order of three to six inches wide, and the height is of a similar order. FIGS. 1 and 2 picture the flotation bumpers as being taller than they are wide, but FIG. 3 pictures the flotation bumpers 114 with an alternate height/width ratio that is approximately equal. It should be understood, however, that the invention is not limited to a particular size or set of dimensions.

Flotation bumpers 114-118 may be secured to the walls 14-18 of tub body 12 using various known methods, including but not limited to the illustrated nut-and-bolt connectors 112 illustrated in the drawings, particularly useful if the bumpers are supplied as an aftermarket or add-on kit for attaching to an existing sled. Other possibilities include adhesives, various plastic welding techniques, and integral molding processes. Flotation bumpers may be secured in either a permanent or removable fashion to the tub body 12; if removability is desired, industrial-strength Velcro® type hook-and-loop fastener secured to mating surfaces of the flotation bumpers and to the upper wall exterior surfaces might also be suitable.

Flotation bumpers 114-118 have a thickness greater than the width of upper peripheral flange 22, if any, on the tub body 12, so that upper surfaces 114*a*, 116*a*, and 118*a* of the flotation bumpers extend beyond flange 22 to form a substantially continuous shelf of buoyant material extending outwardly around the upper periphery of the tub body. The presence of an upper peripheral flange 22 is preferred, particularly where as illustrated the bumpers are secured directly against the lower surface of the flange 22, as it reinforces the connection of the bumpers to the tub body.

The top-to-bottom width of flotation bumpers 114-118 is less than the height of tub body 12, i.e. less than the height of their respective walls 14-18. This results in the bottom surfaces 114*b*, 116*b*, and 118*b* of the flotation bumpers being spaced above bottom 20 of tub body 12 around the lower periphery of tub body 12.

Figure 3:
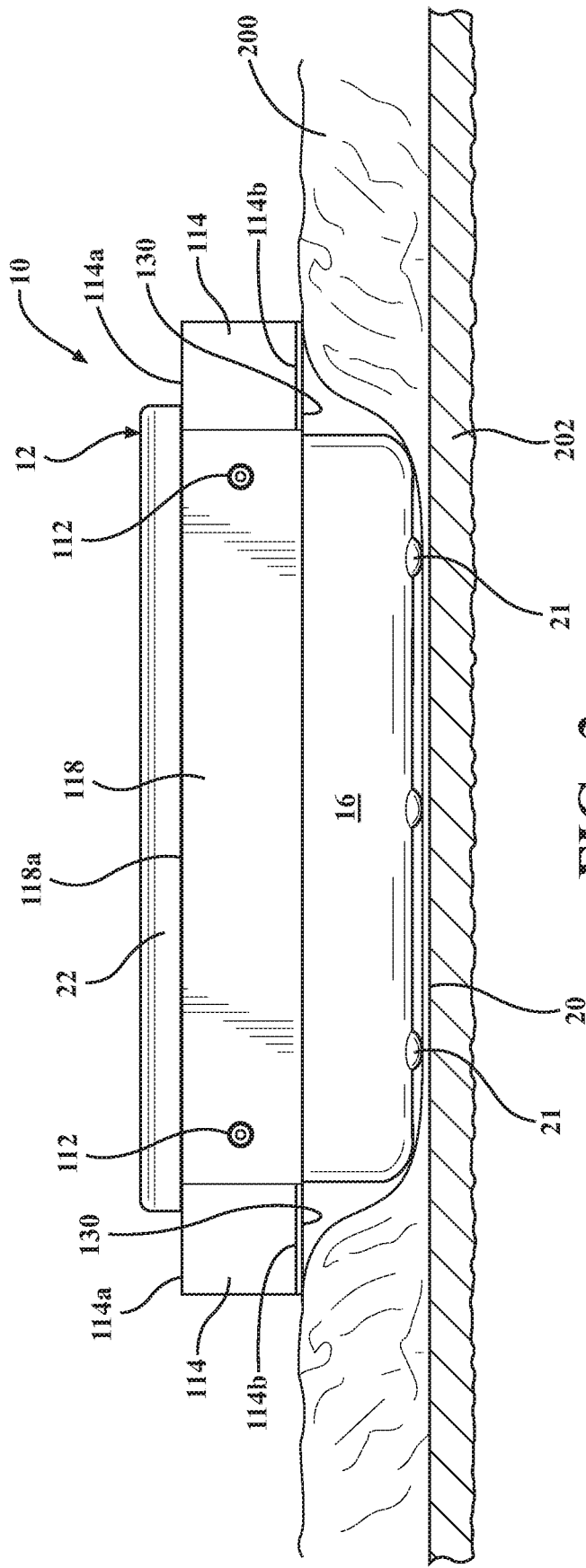
FIG. 3 is a rear elevation view of the sled of FIG. 1.

Referring to FIG. 3, it can accordingly be seen that the bottom surfaces of flotation bumpers 114-118 are normally spaced above the surface of the ice or snow 200 across which sled 10 is being dragged, unless the snow is deep or soft, or unless the ice is very uneven. In order to improve durability and slidability, the bottom surfaces 114*b* of sidewall flotation bumpers 114 are shown faced with hard, low-friction runners or runner surfaces 130 along their length. Runners 130 may be formed from a hard, smooth plastic such as polyethylene or nylon, similar to the bottom 120 of the tub body 12, although other materials could be used, including metal strips. Runners 130 may be secured to the bottom faces of the sidewall bumpers 114 in various ways, for example with mechanical fasteners, adhesives, or by being molded therewith.

Figure 4:
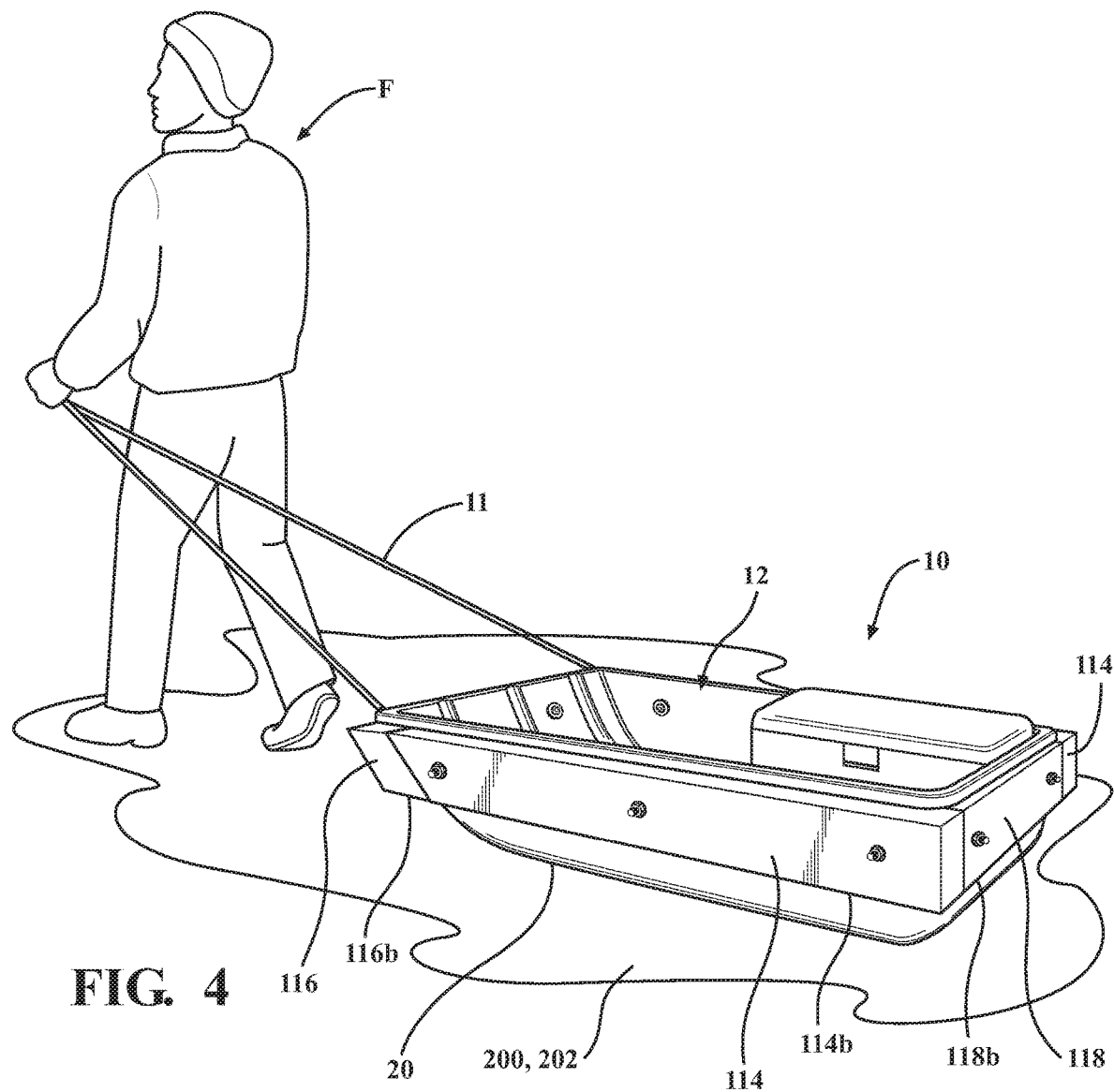
FIG. 4 is a perspective view of an ice fisherman pulling the sled of FIG. 1 across the surface of a frozen lake.

FIG. 4 shows an ice fisherman F pulling sled 10 with a line 11 across a frozen body of water on a surface of snow 200 and ice 202. If the surface is relatively even, as illustrated, the bottom surfaces 114*b*-118*b* of bumpers 114-118 remain spaced above the surface while the bottom 20 of tub body 12 slides along.

Figure 5:
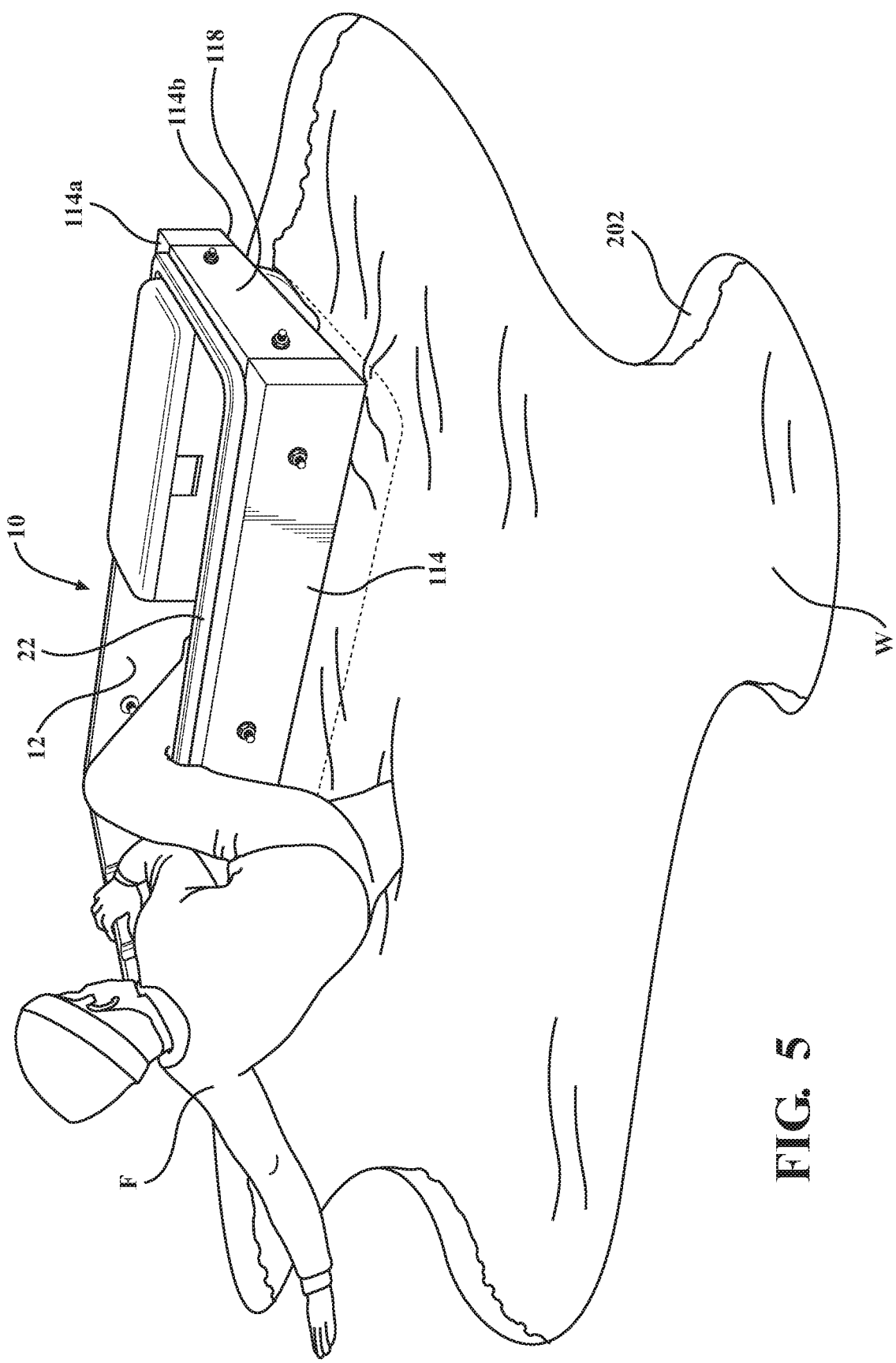
FIG. 5 is a perspective view of the fisherman and sled of FIG. 5 broken through the ice of the lake into a water hole, and the fisherman using the sled for self-rescue.

FIG. 5 schematically shows the ice fisherman F after he has broken through ice 202 into open water W. Whether the sled 10 breaks through with the ice fisherman, or remains on the ice 202 to the side of the open water, the fisherman will usually be able to retrieve the sled via line 11 or by struggling to a point within reach of the sled. Once in the water, the balance of flotation created by bumpers 114-118 about the upper periphery of tub body 12 provides sufficient flotation to support some or (depending on the flotation coefficient and volume/thickness of the bumpers 114-118) all of the fisherman's body weight out of the water. The wider platform or shelf formed by bumpers 114-118 around the upper edge of the sled's tub body 12 will also resist overturning as the fisherman levers his weight up out of the water, and one or more of the bumpers' lower surfaces projecting outwardly from the tub body 12 may be positioned on the ice for additional stability and leverage. If the tub body and the bumpers 114-118 are big enough, and if climbing back onto the edge of ice 202 is not possible due to ice conditions, the size of the hole in the ice, the fisherman's physical capabilities, or other factors, the fisherman may even be able to climb fully into the sled 10 and rest therein while waiting for rescue.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A plastic tub-type sled with improved flotation capability for buoyantly supporting some or all of the weight of an ice fisherman in water to help with self-rescue if the sled and the fisherman have broken through the ice, the sled comprising:
  a plastic tub body comprising raised walls along its sides and ends, a bottom, an open top, and upper edges along upper ends of the walls defining an upper periphery of the tub body;
  a substantially continuous flotation bumper on an exterior of the tub walls adjacent the upper edges, the flotation bumper comprising one or more flotation bumpers arranged in a substantially continuous array around the upper periphery of the tub body and extending sufficiently outward therefrom such that an upper surface of the flotation bumper forms a substantially continuous flat peripheral flotation shelf extending outwardly around the sides and ends of the tub body exteriorly of the tub body;
  the flotation bumper further comprising a flat bottom surface projecting outwardly from the exterior of the side walls of the tub body, the flat bottom surface spaced above the bottom of the tub body generally parallel thereto so as to be spaced above a surface on which the bottom of the tub body is resting or sliding; wherein,
  the upper edges of the tub body walls comprise a substantially continuous peripheral upper flange extending outwardly from the upper edges of the walls, and further wherein the peripheral flotation shelf is located below the peripheral upper flange with a substantially continuous inner portion of the peripheral flotation shelf in substantially continuous supporting contact with a lower surface of the peripheral upper flange around the upper periphery of the tub body, and further wherein a substantially continuous outer portion of the peripheral flotation shelf extends outwardly beyond the peripheral upper flange of the tub body below the peripheral upper flange around the upper periphery of the tub body, and wherein the flat bottom surface of the flotation bumper also extends outwardly beyond the peripheral upper flange of the tub body in substantially continuous fashion along the side walls of the tub body.

2. The sled of claim 1, wherein the tub body comprises straight longitudinal side walls, and the flat bottom surface of the flotation bumper along the straight longitudinal side walls of the tub body is faced with a low-friction runner surface of a material more durable than the flotation bumper.

3. The sled of claim 1, wherein the peripheral upper flange extends around an uppermost edge of the tub body.

4. The sled of claim 3, wherein the peripheral flotation shelf comprises a continuous flat shelf extending around the upper periphery of the tub body below the uppermost edge of the tub body.

* * * * *